No. 862,029.
PATENTED JULY 30, 1907.
W. A. SOMMERHOF.
PIPE ORGAN ACTION.
APPLICATION FILED NOV. 17, 1906.
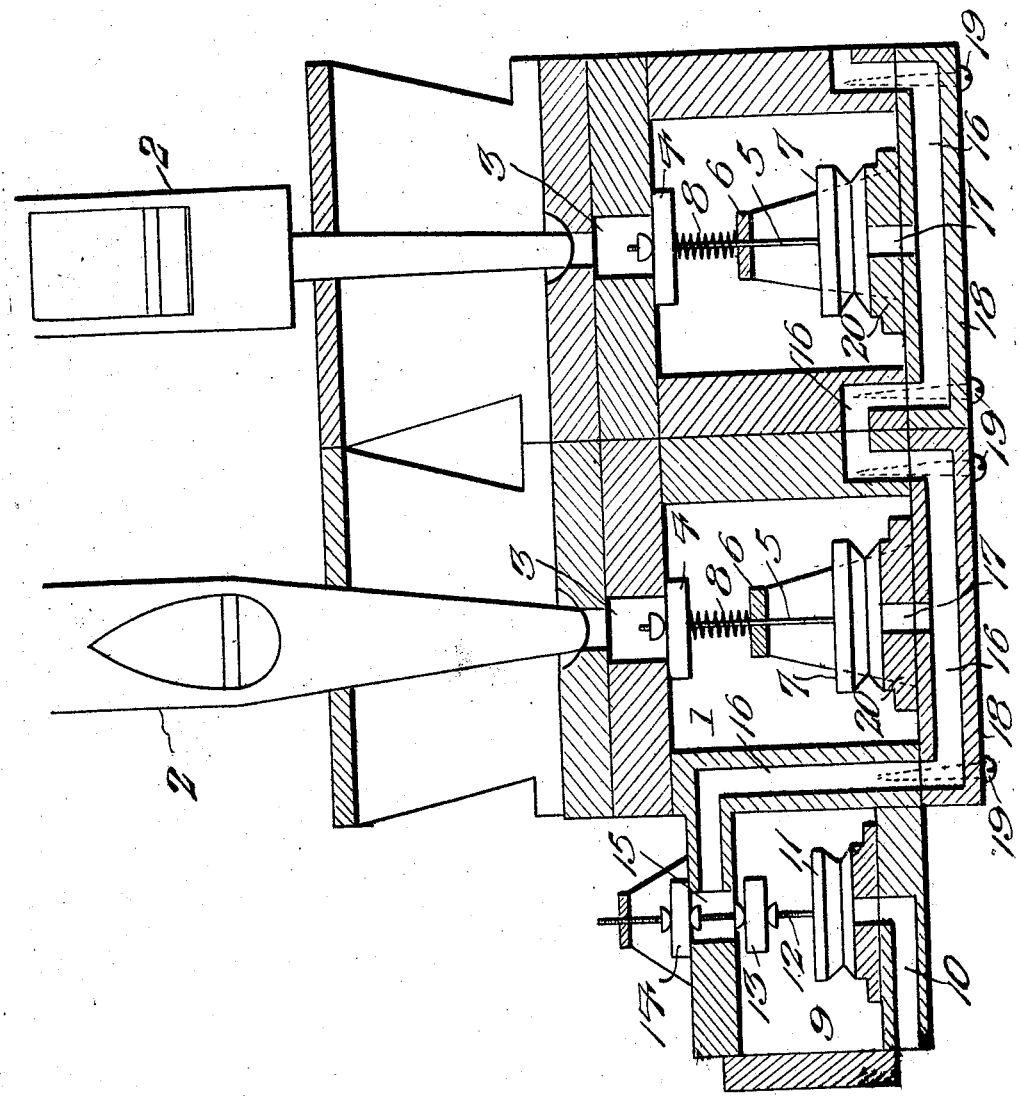
Inventor
William A. Sommerhof,
Witnesses
Wm. Koerth.
F. S. Elmor.
By Victor J. Evans
Attorney

UNITED STATES PATENT OFFICE.

WILLIAM A. SOMMERHOF, OF ERIE, PENNSYLVANIA.

PIPE-ORGAN ACTION.

No. 862,029.

Specification of Letters Patent.

Patented July 30, 1907.

Application filed November 17, 1906. Serial No. 343,865.

*To all whom it may concern:*

Be it known that I, WILLIAM A. SOMMERHOF, a citizen of the United States, residing at Erie, in the county of Erie and State of Pennsylvania, have invented new and useful Improvements in Pipe-Organ Actions, of which the following is a specification.

This invention relates to pipe-organ actions of the type embodying a series of individual compressed air chests or boxes from which the air is admitted to and for sounding the several pipes or reeds arranged respectively above said chests, together with a main key-controlled air box or chest from which the air is admitted to and for controlling operation of controller valves arranged in the individual chests.

The invention has for its objects to provide a simple and efficient means for closing the individual chests whereby ready access may be had to the interiors thereof in the operation of cleaning or repairing the organ and one wherein the individual controller valves are attached to and for removal with the groove boards through the medium of which the chests are closed, in accordance with the invention.

With these and other objects in view, the invention comprises the novel features of construction and combination of parts more fully hereinafter described.

In the accompanying drawing, there is shown a vertical sectional view taken from front to rear through a portion of an organ action, in which the invention is embodied.

Referring to the drawing, it will be seen that the organ embodies a plurality of individual chests or boxes which are normally filled with air under pressure supplied from a suitable source above which are sustained pipes or reeds 2 and having communication at their lower ends with the respective chests through the medium of openings or ports 3 normally closed by valves 4, the vertical movable stems 5 of which are slidably arranged in bearings 6 and rest at their lower ends on bellows 7 which are normally expanded for maintaining the valves securely seated to close the ports, the valves being further acted upon for this purpose through the medium of springs 8 coiled upon the stems 5 to act between the bearings 6 and valves. The action also includes a main valve chamber 9 containing compressed air and having a key-controlled inlet port 10 leading from the main inner box or chest, not shown, and admitting air to and for expanding a normally collapsed bellows 11 on which rests the lower end of a valve rod 12 carrying a pair of vertically spaced valves 13 and 14 disposed to act oppositely for closing an exhaust port 15 leading to the external atmosphere and having communication with the forward end of a passage 16 running from front to rear beneath the individual chests 1 and communicating with the bellows 7 through the medium of branch passages or ports 17 to maintain the bellows in expanded condition, as before mentioned.

In accordance with the invention, the bottoms of the individual compartments 1 are closed by means of a plurality of groove boards 18, one for each compartment, and detachably secured in place by fastening members or screws 19, whereby the boards may be individually removed, it being noted at this point that the passage 16 is formed in part through the boards 18, and furthermore that the valve 13 normally stands in open position to admit air from the compartment 9 through the passage 16 and port 17 for maintaining the bellows expanded while the valve 14 at the same time stands in closed position for cutting off communication between the passage 16 and external atmosphere.

The bellows 7 are each fixed upon an underlying piece or register 20 in turn attached to the adjacent groove board 18, it being understood that the register pieces 20, which may be adjusted for opening and closing the ports 17 will, together with their respective bellows and valves, be carried with and for removal from the compartments when the boards 18 are removed.

In practice, and upon manipulation of the appropriate key, not shown, air under pressure will be admitted through the passage 10 for expanding the bellows 11, thereby carrying the valve 13 to closed position and opening the valve 14, whereby the air will escape from the bellows 7 through the ports 17, passage 16 and port 15 to the external atmosphere, thereby permitting the bellows to collapse under the pressure of the air in the compartments 1 for moving the valves 4 downward against the action of springs 8 and permitting the air to pass from the individual compartments through the ports 3 to and for sounding the pipes or reeds 2. As soon, however, as the supply of air to the passage 10 is cut off, the bellows 11 will again collapse, thus closing the valve 14 and opening the valve 13, whereupon air will flow from chamber 9 through the passage 16 and ports 17 to and for expanding the bellows 7, thus to maintain the valves 4 which were closed under the action of the springs 8 in securely seated condition. When it becomes necessary to clean or repair one of the valves 4 or alter the tension of its spring 8, the corresponding board 18 is detached and removed, carrying with it the valve and attendant mechanism and permitting free access to the interior of the compartment.

After the valve has received the necessary tension, the groove board is again seated in place and secured by means of the fastening screws 19.

Having thus described my invention, what I claim is:

In an organ action, the combination of a plurality of sets of reeds or pipes, a valve chest for each set, ports between the chests and pipes, each chest having a channeled board detachably secured in place to close the bottom thereof, means for connecting adjacent ends of the channels of juxtaposed chests together, a bellows supported on each board and removable therewith, a bearing supported on each board at a point above the bellows thereon; a valve for controlling each pipe, a stem connected with the valve and extending through the bearing in the compartment containing said valve and resting on the bellows thereof, and a spring on each stem resting on the adjacent bearing for holding the valve closed.

In testimony whereof, I affix my signature in presence of two witnesses.

WILLIAM A. SOMMERHOF.

Witnesses:
I. A. TELLERS,
HENRY TELLERS.